March 11, 1952     O. C. BREWSTER     2,588,800
AUTOMATIC FORCE-BALANCE SYSTEM
Filed Dec. 19, 1946
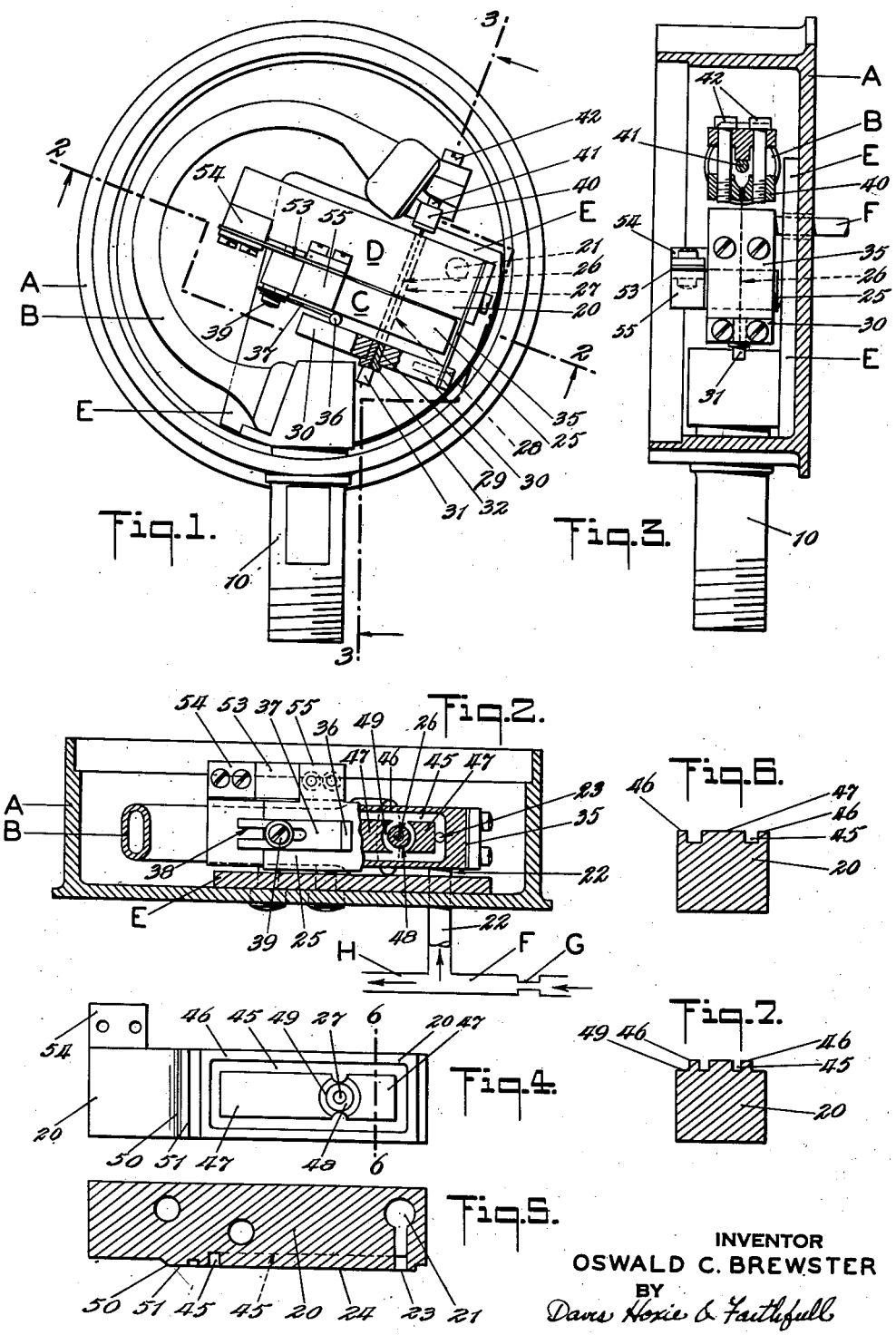
INVENTOR
OSWALD C. BREWSTER
BY
Davis Hoxie & Faithfull
ATTORNEYS Patented Mar. 11, 1952

2,588,800

UNITED STATES PATENT OFFICE 2,588,800

AUTOMATIC FORCE-BALANCE SYSTEM

Oswald C. Brewster, Litchfield, Conn.

Application December 19, 1946, Serial No. 717,156

9 Claims. (Cl. 137—153)

This invention has to do with a force-balance system of the type in which a varying primary force is opposed by a balancing force derived from a continuously supplied pressure fluid and in which, to maintain a balance of the forces, the applied pressure of that fluid is automatically varied by a variably baffled leakage unit in response to changes in the primary force causing imbalance of the opposed forces.

An example of such a system is an instrument known as a pressure transmitter, which is designed to transmit to a distant point a fluid pressure which is usually pneumatic and which is accurately proportional to a primary pressure existing in another fluid to which it is desired to secure a response at the distant point. Such an instrument is used where it is impracticable or undesirable to transmit to the distant point the fluid in which the primary pressure exists, because of the composition, temperature, pressure or other characteristic of that fluid. The responsive mechanism located at the distant point and actuated by the transmitted pressure may be an indicator or a recorder or controller of changes in the primary pressure, or it may be a device which operates or controls a further mechanism in response to changes in the primary pressure.

In such a pressure transmitter, a force generated by the primary pressure, and variable with it, is put in opposition to a force generated by the transmitting fluid which is usually air supplied at a uniform pressure of the order of 15 to 30 pounds. In certain known types of transmitter, this opposition of force is obtained by employing a rocking beam mounted on a ball or roller bearing pivot and subjected at one side of its axis to the force of a diaphragm or metallic bellows on which the primary fluid pressure is imposed. At the opposite side of the axis, the beam is subjected to the force of a diaphragm or bellows on which the pressure of the transmitting fluid is imposed. The transmitting fluid, e. g. air, is continuously supplied through a restricted orifice beyond which, in the direction of flow, is a leakage outlet controlled by a baffle or flapper connected to the rocking beam, so that the rate of leakage is varied when the beam rocks in consequence of unbalance between the opposed forces. Variation of the leakage causes variation of the fluid pressure in the zone between the leakage outlet and the restriction or choke. The fluid delivered to the diaphragm or bellows which acts on the beam is taken from this zone of controlled pressure, as is the output fluid leading to the responsive mechanism at the distant point. The rate of leakage therefore determines the output pressure and the identical pressure applied to exert the balancing force.

In operation, this instrument maintains a balance of the opposed forces at any level of the primary pressure by automatically varying the leakage, through movement of the baffle toward or away from the leakage outlet incident to rocking motion of the beam, and by consequent variation of the balancing pressure of the transmitting fluid. Thus if the primary pressure increases, it unbalances the forces on the beam and the beam moves the baffle to lessen the leakage, causing an increase of air pressure between the leakage outlet and the choke, and therefore an increase in the balancing and output pressure. The system thereby comes into balance again at the higher primary pressure and the new output pressure is accurately proportional to the new primary pressure. The pressure transmitted to the distant point therefore is always a faithful index of the primary pressure.

In my co-pending application, Serial No. 717,155, filed herewith, entitled Pressure Transmitter, I describe and claim certain improvements in such instruments, including the use of a restrained Bourdon tube as the element subjected to the higher of the pressures involved, or for some conditions the use of Bourdon tubes on both sides of such a force-balance system and subject respectively to the primary pressure and the balancing pressure. Such a Bourdon tube exerts an output force accurately proportional to the imposed fluid pressure but of a much lower order. Hence an instrument in which the opposed forces are the output forces of restrained Bourdon tubes, or in which at least the force derived from the higher of the opposing pressures is the output force of a restrained Bourdon tube subjected to that fluid pressure, is greatly simplified and is lighter and more compact in virtue of the reduced level of the forces involved.

The aim of the present invention is to further simplify such instruments and to make them even more compact and less costly, thereby to widen their field of economical application.

It has heretofore been proposed (see U. S. patent to Smoot, No. 1,680,750) to employ for the balancing force in a pressure transmitting system a force directly created by the pressure of the leakage fluid upon the baffle member which controls the leakage, thereby eliminating any separate fluid pressure actuating element such as a bellows or diaphragm. Most commercial fluid pressure transmitters of the force-balance type have nevertheless continued to use such a separate actuator, so far as I am aware. The present invention also dispenses with that separate actuator and by a novel construction and arrangement of the basic functional parts provides a fluid pressure transmitting instrument of great simplicity, retaining the sentitivity, accuracy and ruggedness of the much larger and heavier instruments now in use, and creating a much more compact instrument, as illustrated by the one here shown in particular which is adapted for a primary pressure up to 5000 pounds and yet is contained in the casing of an ordinary Bourdon gauge of that rating.

In the annexed drawings of an improved pressure transmitter illustrative of the invention, Fig. 1 is a plan view of the complete instrument with the cover removed to reveal the relation of the Bourdon tube, the baffle, the leakage nozzle, and the connecting parts;

Figs. 2 and 3 are views in partial section on the lines 2—2 and 3—3 respectively in Fig. 1;

Fig. 4 is a plan view of the outlet face of the nozzle member;

Fig. 5 is a sectional view of the nozzle member of the same instrument;

Fig. 6 is a sectional view on the line 6—6 of Fig. 4; and

Fig. 7 is a similar view of a similar nozzle member of smaller pressure area.

The complete instrument shown in the drawings has the following main parts: A circular casing A, a primary force element B in the form of a restrained Bourdon tube, and a baffled leakage unit comprising the baffle member C and the nozzle member D. There are also fluid connections through the casing for conveying a primary pressure fluid to the Bourdon tube and a transmitting fluid such as air to the leakage unit to provide both for the internal functioning of the instrument and for its connection to a system in which it serves the usual purpose of a pressure transmitter.

For convenience I have used for this instrument the conventional casing of a Bourdon tube pressure gauge, retaining the usual mounting of the Bourdon tube B on a back plate and its connection through the wall to a fluid inlet nipple 10 where connection is made to the primary pressure line leading from a flow line or pressure vessel. The particular instrument shown is designed to deal with a primary fluid pressure up to 5000 pounds, to illustrate the great compactness that can be had with such a high pressure or an even higher one. This part of the instrument, being of known construction, needs no detailed description.

The baffled leakage unit which serves both to create and to regulate the balancing force is mounted within the casing A in relation to the Bourdon tube as shown. The nozzle member D is firmly fixed to the back plate E, which here is wider than in a Bourdon gauge, while the baffle member C is fulcrumed on the nozzle member D and is connected to the tip of the Bourdon tube B by a compound leverage including a link which passes through the fixed nozzle member D and the baffle C. The nozzle member contains a passage for the transmitting fluid which is introduced through the supply line F and is delivered through the internal passage to the outlet face, that is, the one adjacent the baffle member C. The usual choke G and output connection H associated with a baffled leakage control unit are not within the instrument casing in this particular form but are in the transmitting fluid supply line. The pressure of the transmitting fluid at the output connection H and at the leakage nozzle is determined by the rate of leakage from between the nozzle and baffle.

The area of the baffle element C subjected to the pressure of the leakage fluid is such that an initial force is created which, when amplified or diminished as need be by the intermediate leverage, is applied to the tip of the Bourdon tube, and is opposed to and of the same order as the output force exerted by the tube.

Thus, without considering details of the particular construction of leakage unit and leverage which include novel features described below, it can be seen that the novel aspect of the general organization of the force-balance system is that the variable primary force, which here is the output force of the Bourdon tube and which varies in proportion to the primary fluid pressure, is opposed and balanced solely by a force created by the baffle of the leakage control unit under the controlled pressure of the leakage fluid. The linkage connecting the tube to the baffle serves two purposes. It is the medium through which the forces exerted by the two are opposed to each other, modifying the initial force or not as the need may be, and the medium by which the Bourdon tube is restrained from all but extremely limited motion; and it is the means by which the baffle is moved to vary the leakage, and so to control the applied and output pressure of the transmitting fluid, in response to the minute movement of the restrained Bourdon tube incident to change in the primary force.

It is within the broad invention here disclosed to dispense with any intermediate leverage, making the baffle large enough to develop the balancing force without amplifying leverage, and connecting the baffle directly to the Bourdon tube. For many purposes it is preferable however to employ an intermediate leverage, even when used to diminish the initial baffle force, in view of the simplicity of the leverage which may be used and its easy capacity for adjustment to fix the desired balancing force range.

Considering the instrument in a more detailed way, the chief features are the leverage linking the baffle C to the Bourdon tube B, including a simple means for adjusting the degree to which the initial force is modified by the leverage and a simple means for imposing an initial biasing tension on the baffle; the configuration of the contiguous faces of the baffle and nozzle to form the variable leakage path and to determine the area of effective pressure on the baffle; and the means by which the baffle is fulcrumed on the nozzle member and attached to it with freedom for slight motion toward and away from the nozzle to vary the leakage path.

The leakage control unit is placed in the well of the casing A in the available space between the tip and the base of the Bourdon tube B. This makes it convenient to have the main connecting link 26 between the tube and the baffle lie approximately on the natural line of force exerted by the tube. No tie is used to suppress one component of its force as in certain forms of restrained Bourdon tube transmitter shown in my co-pending application mentioned above.

The nozzle member D lies between the baffle C and the tip of the tube B, with its outlet facing away from the tip and toward the baffle, which is on the side away from the tip. Thus the leakage pressure applied to the baffle tends to move it away from the tip of the tube, and its link to the tube is therefore under tension and exerts an inwardly directed force on the tube opposing the outwardly directed force of the tube itself.

This is for a primary pressure above atmospheric which tends to swing the tip of the tube outwardly requiring an inward opposing force. For a subatmospheric primary pressure, the relation to the tube could be reversed so that the baffle force would be outward to oppose the inward force of the tube under that condition; but preferably in such case the inwardly directed tube force is opposed by an outwardly directed constant spring force of such magnitude as to exceed the tube force, unless when the latter is at its maximum. The balancing force of the baffle is then opposed to the differential of these forces, and is directed inwardly since the superior spring force is outward. That arrangement permits the nozzle and baffle to be located in the same relation to the tube as is shown here, and puts the connecting link under tension rather than compression.

The nozzle member shown here is a rectangular block of metal 20 held by machine screws or welded to the back plate E. I term it the nozzle member because it is the member through which the transmitting fluid is delivered to the outlet where the leakage occurs under control of the baffle. It contains a passage 21, to which the inlet air line 22 leads, and which opens at 23 to the grooved face 24. The lip or lips bordering the grooves, in coaction with the baffle face, form the peripheral leakage path and determine the pressure area. The baffle is a similar rectangular metal block 25 which is fulcrumed (in a manner described below) on the outlet or leakage side of the nozzle block 20. In the form here, its surface facing the nozzle is smooth.

The main element connecting the Bourdon tube tip to the baffle, through the compound leverage located at the side of the baffle away from the nozzle, is a piece of music wire 26. This wire link is connected at the top (in Fig. 1) to the tip of the tube, with means described below for adjusting the initial tension upon it, and it extends through a hole 27 in the nozzle block, and through registering holes 28, 29 in the baffle 25 and lever arm 30, to an end piece 31 in which it is silver soldered. These holes or wireways 27, 28 are larger than the wire to assure that there will be no frictional contact, and all three wireways 27–29 are large enough so that in taking the device apart the end piece 31 can pass through them.

When assembled, the end piece 31 is held from entering the hole 29 in the lever arm 30 by chocks 32. These consist of two separate but complementary pieces which together form a shank that fits snugly around the wire and enters the hole 29 in the lever arm, and a shoulder or flange which is larger than the hole and bears on its rim, thus anchoring the lower end of the wire. The wire is tightened up by the adjusting means at its other end and so connects the tip of the tube to the lever arm 30 that a force exerted by either of them is applied to the other.

The lever arm 30 is hinged on the nozzle block 20 by means of a spring strap 35 held by screws to the end of the nozzle block and to the end of the lever arm. This is one arm of a compound adjustable leverage of which the baffle, fulcrumed at the opposite end of the nozzle block, is the other member. Their point of bearing upon one another is determined by the position of the transverse contact pin 36 which lies between them and is adjustable lengthwise. This pin is fixed at the end of a flat member 37 which has a slot 38 through which its retaining screw 39 passes and which permits it to be adjusted back and forth to locate the contact pin 36 nearer the one fulcrum or the other of the overlapping arms of the compound leverage.

The pressure of the leakage fluid on the baffle creates an initial force which may be considered as if it were a force applied to the baffle at a single point within the pressure area, called the center of pressure. This tends to swing the baffle out against the lever arm 30, its force being applied to the arm through the contact pin 36; and in turn that causes the arm to swing out so as to put a tension on the wire 26, and through it to exert a tensile force on the tip of the Bourdon tube.

The initial baffle force depends on the pressure of the leakage fluid and upon the effective pressure area. The resulting force applied to the lever arm 30 through the contact piece 36 depends further on the relative distances of that piece and of the center of pressure from the fulcrum of the baffle. That relation of lever arm distances depends on the location of the contact piece 36. The force applied through the contact piece is greater as the contact piece is nearer the fulcrum point of the baffle. The force exerted by the lever arm 30 on the wire 26 depends similarly on the relative distances of the contact piece and the wire from the pivotal axis of the lever arm, being greater as the contact piece is more distant from that axis and nearer the baffle fulcrum.

Thus, moving the contact piece 36 nearer to the fulcrum of the baffle increases both the force applied to the lever arm 30 and the resulting force applied to the wire. A small movement therefore gives a relatively large effect, which makes it possible with a relatively small total range of movement of the contact piece 36 to get a relatively large range of a variation in the degree to which the initial baffle force is modified by the leverage. As shown here, the leverage amplifies the initial force, but the same system can be adapted to diminish that force, as may be desired in opposing a low primary force, instead of resorting to a very small pressure area at the baffle to get a smaller initial force. The design of this leverage for different force conditions is in accordance with understood principles of mechanics and needs no further elucidation here.

The means for putting the desired initial tension on the wire 26, to impose a biasing force on the baffle requiring some minimum pressure of the transmitting fluid to open it and balance the minimum primary force (usually zero), consists of a two-part connecting unit coupled by adjusting screws which draw the two parts together. One part is the end piece 40 silver soldered to the upper end of the wire link 26, and the other is a T-shaped piece welded to or formed as an integral part of the tip 41 of the Bourdon tube. The adjusting screws 42, accessible at the side of the casing, extend through the arms of the T and thread into taps in the end piece 40. The latter has a central groove or recess 43 which telescopes over the leg of the T to give an ample range of adjustment. The screws thus hold the end piece and the wire to the Bourdon tube, and permit the tension on the wire to be adjusted.

The design of the contiguous faces of the nozzle and baffle which form the leakage path and determine the pressure area is shown in Figs. 2 and 4–6. The configuration shown here as being embodied in the nozzle face, used with a smooth baffle face, could as well be embodied in the baffle face, using a smooth nozzle face, or it could be in both of these coacting faces. In brief, what is formed is a shallow recess forming a pressure space between the nozzle and baffle, from which the air escapes over the peripheral rim or lip.

There is a rectangular groove or recess 45 in the face of the nozzle block. This leaves a narrow ridge or lip 46 around the outside, with preferably a boss 47 left in the central portion. The air passage 21 opens to this groove at 23, so that air flows around the groove and out over the lip 46 on all sides, as it were over a weir or spillway, in a peripheral path defined by the space between this lip and the overlying baffle surface.

There is a secondary leakage path over the rim or lip 48 surrounding the hole 27 for the wire link 26; and a transverse groove 49 on each side of this secondary lip 48 connects with the main groove 45. Air flows out over this smaller lip to and through the hole 27 to the outside.

Air of course flows across the central boss 47 within the main groove, and from the standpoint of flow the whole central area occupied by this boss could be recessed. However I believe it is better to retain this boss since it forms an air cushion of seeming advantage in helping to prevent chattering.

The fulcrum for the baffle is the rear corner 50 of a transverse rib 51 located near one end of the nozzle block. The top surface of this rib is in the plane of the lips 46 and 48 so that the baffle can close to a position in which its plane surface can rest on the rib and on these lips and seal against leakage. The surface of the boss 47 can be in this same plane, and must not lie above it when the baffle has a plane surface. Preferably it is ground down slightly below the plane of the lips and the fulcrum rib.

It is important to lap the surfaces of the fulcrum rib and the lips, and the co-acting baffle surface, to eliminate any minute irregularity which would cause contact at one or more points before the leakage path as a whole is closed. The force used in pressing down such contact points would introduce a source of error which might be material.

To hold the baffle from lateral displacement, while leaving it free to rock on the fulcrum, I attach it to the nozzle block by a spring steel strap 53 held at one end to a stud 54 at the side of the nozzle block and at the other end to a like stud 55 at the side of the baffle. The thin strap, straddling the plane at which the baffle and nozzle faces meet, permits the baffle to come to a fully closed position on the nozzle, although when in operation the baffle preferably does not fully close at the maximum balancing pressure, a condition assured by designing the instrument so that the maximum pressure needed to create a force equal to the maximum primary force is less than the air supply pressure back of the choke.

It usually is desired to manufacture a line of instruments for different primary pressure ranges. The use of Bourdon tubes lends itself well to that. As to the balancing or transmitting pressure side, it is advantageous to standardize the parts for the instruments of different rating, and this nozzle and baffle unit together with the adjustable leverage system lends itself to that. The adjustable leverage makes it possible to employ a nozzle and baffle of given pressure area, and consequent initial force, with a considerable range of primary pressures, owing to the rather wide range over which it is possible to fix the ultimate force opposed to the primary force for a given initial force at the baffle. Consequently a few sizes of nozzle and baffle unit, each serving for several ranges of primary force in virtue of the adjustability of the lever advantage, cover a wide range of instrument sizes in terms of the primary pressure to be dealt with.

It is even possible to standardize much of the manufacture of the nozzle and baffle unit. As shown in Fig. 6, if a smaller initial force is desired, one can use the identical baffle and a nozzle member which is identical except for the size of the pressure area determined by the location of the outer lip 46. Comparing Figs. 6 and 7 (which are corresponding sectional views) it will be seen that the lip 46 in Fig. 6 is located somewhat in from the edge of the nozzle block, leaving the shoulder 49 around it below the plane of contact between the lip and the baffle surface. The leakage path or spillway is, as before, defined by the space between the confronting surfaces of the lip and the baffle, and opens to the outside at the outer perimeter of the lip; together with the like space at the lip 48 around the wire hole. Moving the lip inward reduces the leakage path, but the rectangular shape gives close to a maximum path for a given pressure area, which is generally desirable.

The principal effect, however, of moving the lip inward is to reduce the pressure area, that is, the area of baffle surface subjected to the pressure of the leakage fluid. The effective area, equivalent to an area giving the same force from a uniform pressure, is defined not by the outer edge of the lip 46, less the area within the lip 48, but by a perimeter between the inner and outer edges of the lips. There is a pressure drop across the lip, to atmospheric pressure at the outer edge, so the effective area, or area equivalent to an area subjected to the full presure within the lip, is something less than that bounded by the outer edge. While this is calculable quite accurately, the simpler practice is to approximate the desired area and to rely on the adjustability of the leverage to get the desired force for any given pressure of the transmitting fluid. In any event, locating the lip 46 nearer the center reduces the pressure area and therefore reduces the initial baffle force created at any level of the baffle controlled transmitting pressure.

In such a tightly coupled system as that shown, and with the nozzle and baffle shown, I can confine the baffle motion, at the end away from the fulcrum where its motion is greatest, to a distance of the order of 0.0005 inch, which is several fold less than is common practice. The motion is not perceptible to the eye in varying the primary pressure from zero to 5000 pounds. Viewed through a microscope of 70 power, the motion is visible and is seen to be smooth and free from hunting, and no vibration is visible when the primary pressure is held. It is inherent in such a system that in holding a balance the baffle is in vibratory motion, but that motion here is so small as not to appear even at the magnification mentioned.

This extremely small baffle motion minimizes any error introduced by the spring characteristic of the primary pressure element, and widens the area in which it is possible to dispense with special devices to minimize or to compensate for the effect of that spring characteristic. However, for very low ranges of primary pressure, and especially with Bourdon tubes or other fluid pressure elements of high spring rating, it is desirable to use such a supplemental device. Two such means are described in my co-pending application identified above, and reference is made to it for a description of the conditions which call for their use.

In practice, it is desirable to take precautions to prevent vibrations emanating from what apparently is resonant vibration of the air in the dead-end output line. A suitable choke in that line, near the transmitter, will suppress such pulsations if they do occur. The casing cover and other parts should also be kept tight or audible vibrations may be induced.

It being known that in a baffled leakage control unit the nozzle, rather than the baffle, may be the movable element, I intend that transposition to be within all my claims as an equivalent, with the understanding that in such case the balancing force would be exerted by the nozzle member which then would be the element conneected to the primary element to apply the balancing force created by the controlled pressure at the leakage outlet.

I claim:

1. In a force-balance system having a primary force element in combination with an automatically regulated fluid pressure balancing means including a baffled leakage control unit, the improvement which comprises a pivoted baffle member, a pivoted lever arm overlying the baffle member, means connecting said lever arm to the primary force element and a contact member between the baffle and lever arm adjustable in position with respect to the axes of said pivoted members to vary the force applied to the primary force element for a given initial force caused by the controlled pressure of the leakage fluid on the baffle.

2. In a force-balance system having a primary force element in combination with an automatically regulated fluid pressure balancing means including a baffled leakage control unit, wherein the balancing force is created by the pressure of the leakage fluid upon the baffle, a means connecting the primary force element to the baffle comprising a tension member and adjustable means for applying a biasing tension to said member to fix the minimum fluid pressure at which the baffle opens.

3. In a force-balance system having a primary force element in combination with an automatically regulated fluid pressure balancing means including a baffled leakage control unit, wherein the balancing force is created by the pressure of the leakage fluid upon the baffle, a means connecting the primary force element to the baffle comprising a wire link and adjustable means for applying a biasing tension to said member to fix the minimum fluid pressure at which the baffle opens.

4. A fluid pressure transmitter comprising a Bourdon tube adapted to be subjected to a variable primary fluid pressure, a nozzle member mounted between the tip and base of said tube and having a fluid outlet with means for delivering a transmitting fluid thereto, a baffle member coacting with said outlet to vary the leakage therefrom, means including an adjustable leverage for tightly coupling said baffle to the tip of said tube whereby the tube is restrained and the baffle is moved by movement of said tip incident to variation in the primary fluid pressure and whereby the controlled pressure of said transmitting fluid upon the baffle creates a force opposing the output force of said tube, the area of the baffle subject to said pressure being such that the said opposing force balances the said output force.

5. A fluid pressure transmitter comprising a Bourdon tube adapted to be subjected to a variable primary fluid pressure, a nozzle member mounted between the tip and base of said tube and having a fluid outlet with means for delivering a transmitting fluid thereto, a fulcrumed baffle member coacting with said outlet to vary the leakage therefrom, a pivoted lever arm overlying said baffle, an adjustable contact member between said lever arm and baffle and a link tightly coupling said lever arm to the tip of said tube and restraining said tube, whereby motion of the said tip incident to change in primary fluid pressure causes movement of the baffle to vary the transmitting fluid pressure and the controlled pressure of said fluid on the baffle creates a force opposing the output force of said tube, the baffle area subject to said pressure being such that the said opposing force balances the said output force.

6. A transmitter according to the next preceding claim in which the said link is a wire and in which there is a means for adjusting the connection of said wire to impose a biasing force on the baffle.

7. A pressure transmitter instrument comprising a casing, a Bourdon tube mounted therein, a fixed nozzle member mounted between the base part and the outer part of said tube, a baffle member hinged on said nozzle member, means at opposing faces of said members defining a pressure area and leakage path of pre-determined peripheral size, a pivoted lever member mounted adjacent said baffle and adapted to apply a force thereto at a predetermined point in relation to the fulcrum point of the baffle, and a tension member coupling said lever member to the outer part of said tube to tend to hold said baffle against said nozzle.

8. An instrument, according to the preceding claim, in which the said point at which the lever applies to the baffle a force exerted by the tension member is adjustable.

9. A pressure transmitter instrument comprising a casing, a Bourdon tube mounted therein with provision for an external connection to admit a primary pressure fluid, a pair of members having confronting faces mounted in the casing and extending between the tip and the base of the Bourdon tube, said members having provision for relative movement by which said confronting faces may be variably spaced apart and form a baffled leakage unit, means for delivering a transmitting fluid to the zone of said confronting faces comprising a fluid passage in one of said members ending at a port in its confronting face, means at said faces and associated with said port which define a pressure area and a leakage space of pre-determined peripheral size but variable in area with relative movement of said members, and a mechanical connection between a movable member of said pair and the tip of said Bourdon tube whereby said tube is substantially restrained from movement and the force applied to said connection by fluid pressure within the tube is opposed by the force applied thereto by the pressure of the transmitting fluid on the pressure area at said confronting faces.

OSWALD C. BREWSTER.

REFERENCES CITED

The following references are of record in the file of this patent:

UNITED STATES PATENTS

| Number | Name | Date |
| --- | --- | --- |
| 1,630,977 | Smoot | May 31, 1927 |
| 1,674,456 | Smoot | June 19, 1928 |
| 1,680,750 | Smoot | Aug. 14, 1928 |
| 2,264,262 | Erbguth | Nov. 25, 1941 |